Feb. 3, 1925.
O. GREEN
FISH LURE
Filed April 10, 1924
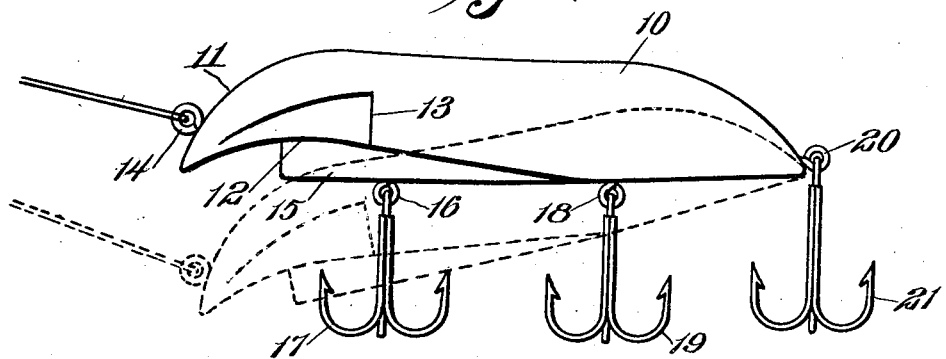
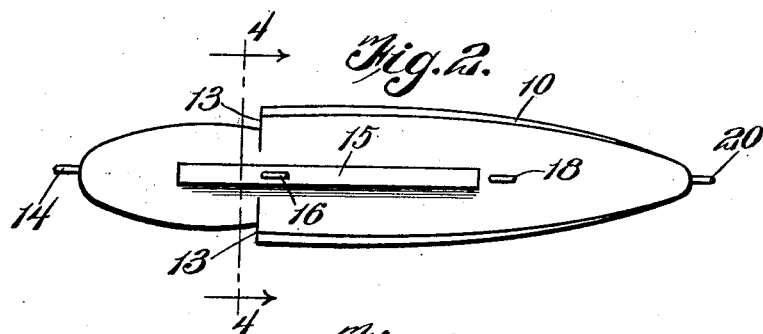
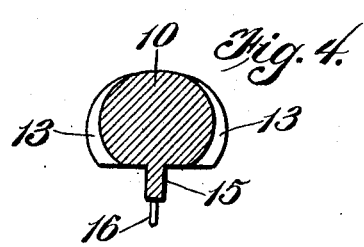
Inventor
Oliver Green
Watson E. Coleman
Atty Patented Feb. 3, 1925.

1,525,291

UNITED STATES PATENT OFFICE.

OLIVER GREEN, OF MICHIGAN CITY, INDIANA.

FISH LURE.

Application filed April 10, 1924. Serial No. 705,614.

*To all whom it may concern:*

Be it known that I, OLIVER GREEN, a citizen of the United States, residing at Michigan City, in the county of La Porte and State of Indiana, have invented certain new and useful Improvements in Fish Lures, of which the following is a specification, reference being had to the accompanying drawings.

This invention relates to fish lures, and particularly to casting plugs of that type wherein the forward end of the plug has a downwardly and forwardly inclined face so as to cause the plug to dive.

The general object of the present invention is to so improve the plug that when it is pulled through the water it will not only dive and have a more or less erratic motion but the tail end of the plug will oscillate laterally back and forth so as to simulate more perfectly the movements of a minnow or other fish.

A further object is to provide a plug of the character described with a longitudinally extending keel or fin disposed preferably at the forward end of the plug and which acts to cause this lateral oscillation of the rear end of the plug.

My invention is illustrated in the accompanying drawing, wherein:—

Figure 1 is a side elevation of a fish lure constructed in accordance with my invention, showing in dotted lines the position of the fish lure when in use;

Figure 2 is a bottom plan view of the lure;

Figure 3 is a top plan view thereof;

Figure 4 is a section on the line 4—4 of Figure 2.

Referring to this drawing, 10 designates the body of the plug, which may be of any suitable material and which is nearly cylindrical in form. The forward end of the plug has a downwardly and forwardly inclined face 11 which is laterally rounded. The bottom of the plug from the extreme forward end thereof for nearly two-thirds of its length is concavely curved, as at 12, this concave curvature being relatively deep at the nose of the plug and then extending rearward in a relatively long curve. The under face of the nose 11 is transversely rounded and the nose itself is relatively narrower than the body of the plug so that two shoulders 13 are provided on each side of the nose of the plug. Rearward of these shoulders the body of the plug is transversely flat. An eye 14 is attached to the forward end of the plug whereby a line may be connected thereto.

Extending downward from the body of the plug with its lower edge flush with the surface of the rear end of the plug is the keel 15 which terminates forward of the forward end of the plug. This keel is relatively narrow. An eye 16 is attached to the keel just below the shoulders 12 and from this eye depends the gang hooks 17. A second eye 18 is attached to the plug at the rear end of the keel and has thereon gang hooks 19, and an eye 20 is attached to the extreme end of the body or plug, to which is attached the gang hooks 21.

In the use of this device, when strain is placed upon the line, the plug will dive to an extent depending upon the speed with which it is drawn through the water. At the same time the peculiar form of the plug will cause it to oscillate laterally so that the plug in moving through the water will have a very great similitude to a minnow or other bait fish, and it has been found in practice that this lure is particularly effective with bass.

I do not wish to be limited to the exact form illustrated, as this may be modified in many ways without departing from the spirit of the invention. The principal feature of the invention is the keel 15 which controls the action of the lure or plug. The force of the water acts first on one side and then on the other side of the keel and this causes the rear end of the lure to oscillate, that is the head of the lure will draw straight through the water without any lateral movement, but the tail end of the lure will oscillate laterally.

With this construction there is no darting from side to side but the lure simulates the actual motion of a live minnow. Without this keel, a lure constructed in accordance with my invention will have too much of a wiggle. The keel acts as a governor and holds the lure from zigzag or darting motion.

I claim:—

1. A plug of the character described comprising an elongated body having a downwardly extending inclined front end, and hooks attached to the body, the body being provided with a longitudinally extending depending keel.

2. A fish lure of the character described comprising a body having a rounded upper surface, the forward end of the body terminating in a downwardly and forwardly extending nose, laterally extending shoulders on each side of the nose, and a keel extending longitudinally along the bottom of the body.

3. A fish lure of the character described comprising a body having a rounded upper surface, the forward end of the body terminating in a downwardly and forwardly extending nose, laterally extending shoulders on each side of the nose, and a keel extending longitudinally along the bottom of the body, said keel at its rear end being flush with the bottom of the body rearward of the keel and at its forward end depending below the nose.

4. A fish lure of the character described having an elongated body having a transversely rounded upper surface and carrying gang hooks, the upper surface of the forward end of the body being downwardly and forwardly rounded and having means for attaching a line thereto, the under surface of the forwardly and downwardly rounded nose being laterally rounded and terminating in forwardly directed shoulders, the under face of the body having a longitudinally extending cavity, and a keel disposed in said cavity and projecting downward from the body, the rear end of the keel being flush with the rear end of the body and the forward end of the keel extending to a point beneath the nose.

In testimony whereof I hereunto affix my signature.

OLIVER GREEN.